US007203769B2

(12) United States Patent
Schnier (10) Patent No.: US 7,203,769 B2
(45) Date of Patent: *Apr. 10, 2007

(54) BOOTSTRAPPING TECHNIQUE FOR DISTRIBUTED OBJECT CLIENT SYSTEMS (75) Inventor: Randall R. Schnier, Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1616 days.

(21) Appl. No.: 08/818,185

(22) Filed: Mar. 14, 1997

(65) Prior Publication Data
US 2001/0003824 A1 Jun. 14, 2001

(51) Int. Cl.
G06F 15/16 (2006.01)
(52) U.S. Cl. .............. 709/330; 709/303; 709/219
(58) Field of Classification Search ........... 395/200.31, 395/701, 49, 33, 800, 700, 186; 345/329; 380/25; 370/352; 707/103, 513, 3, 102, 707/106; 434/350; 709/200, 160, 171, 203, 709/304, 220, 229, 230, 221, 217; 710/11
See application file for complete search history.

(56) References Cited

U.S. PATENT DOCUMENTS 5,475,840 A * 12/1995 Nelson et al. .............. 395/700
5,481,721 A *  1/1996 Serlet et al. ............... 395/700
5,613,148 A *  3/1997 Bezviner et al. ........... 395/800
5,680,461 A * 10/1997 McManis ..................... 380/25
5,727,145 A *  3/1998 Nessett et al. ............. 395/186
5,727,147 A *  3/1998 Van Hoff ............... 395/200.31
5,727,950 A *  3/1998 Cook et al. ................. 434/350
5,737,607 A *  4/1998 Hamilton et al. ........... 395/701
5,790,855 A *  8/1998 Faustini ..................... 395/701
5,793,365 A *  8/1998 Tang et al. ................. 345/758
5,815,708 A *  9/1998 Kessler et al. ............. 709/318
5,857,100 A *  1/1999 Phillips et al. ............. 709/160
5,867,495 A *  2/1999 Elliott et al. ............... 370/352
5,873,092 A *  2/1999 Cheng et al. .............. 707/103
5,878,260 A *  3/1999 Copeland et al. ............ 717/2
5,881,230 A *  3/1999 Christensen et al. ....... 709/203
5,913,029 A *  6/1999 Shostak ..................... 709/203

(Continued)

OTHER PUBLICATIONS

ORB Interoperability Architecture, www.infosys.tuwien.ac.at/Research/Cobra/OMG/inarch.htm, 1995.*
CorbaWeb: AGeneric Object Navigator. www5conf.inria.fr:80/fich_html/papers/P33/Overview.html, May 10, 1996.*

(Continued)

Primary Examiner—Thong Vu
(74) Attorney, Agent, or Firm—Wood, Herron & Evans, LLP (57) ABSTRACT A method and apparatus for bootstrapping an object client system with an object server system in a distributed system is provided. The method and apparatus are particularly applicable to use over the internet with web servers and web browsers. The method allows the use of a "zero install" web client to operate on remote objects through the web server, and can thus facilitate a host of distributed object operations. An object reference server is used to distribute an object reference for a naming context object to an object request broker on the web browser. In the preferred embodiment, the object reference server comprises a web server with access to the object reference and the object reference comprises a stringified object reference. By delivering the stringified object reference to the web browsers, interaction between the web browser and remote server objects over the internet is facilitated.

33 Claims, 5 Drawing Sheets

U.S. PATENT DOCUMENTS

| | | | | |
|---|---|---|---|---|
| 5,953,731 A | * | 9/1999 | Glasser | 707/513 |
| 5,974,441 A | * | 10/1999 | Rogers et al. | 709/200 |
| 5,991,802 A | * | 11/1999 | Allard et al. | 709/219 |
| 5,991,823 A | * | 11/1999 | Cavanaugh, III et al. | 709/304 |
| 6,009,266 A | * | 12/1999 | Brownell et al. | 709/171 |
| 6,009,464 A | * | 12/1999 | Hamilton et al. | 709/219 |
| 6,031,977 A | * | 2/2000 | Pettus | 709/230 |
| 6,134,583 A | * | 10/2000 | Herriot | 709/217 |
| 6,151,637 A | * | 11/2000 | Phillips et al. | 709/303 |

OTHER PUBLICATIONS

Dave Orchard. www.pacificspirit.com/Courses/JavaObj/printabl.htm, Aug. 1996.*

Kessler et al, JavaOne , May 1996.*

Williams, An Emergency Management Demonstrator Using the high Level Architecture. Sep. 1996.*

Kessler, JAVAONE'96 Presentations, www.javasoft.com/javaone/javaone96/pres/.*

* cited by examiner

BOOTSTRAPPING TECHNIQUE FOR DISTRIBUTED OBJECT CLIENT SYSTEMS

BACKGROUND OF THE INVENTION

1. Technical Field

The present invention relates in general to object-oriented computer systems. More specifically, the present invention relates to the field of distributed object systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems. This worldwide network is often referred to as the "world-wide web", or WWW. A user at an individual PC or workstation that wishes to access the WWW, typically does so using a software application known as a web browser. A user that accesses the WWW with a web browser is known as a web client. Web browsers communicate with computer systems called web servers. Typically, a web client accesses a resource on the WWW by transmitting a special address known as a Uniform Resource Locator (URL) to the web server. A URL identifies a particular web server and a particular resource on the web server that the web client wishes to access. The web server then delivers the resource to the web browser.

The web server thus acts as a type of specialized file server, delivering resources when requested by the client. While this relatively simple interaction has formed the basis for the recent explosion in the size and use of the WWW, it is limited in the type of functionality it can provide. To fully realize the potential of the WWW in commerce and other activities, the WWW needs to be better integrated with existing technologies in a way that fully utilizes the potential of the WWW while leveraging existing technologies. Two such technologies are oriented programming and distributed object systems.

Object oriented programming is a method of programming computer programs that has become very popular over the past several years. Computer programs written in an object-oriented environment are known as object-oriented programs. Object-oriented programming differs from standard procedural programming in that it uses objects, not algorithms, as its fundamental building blocks. Thus an object-oriented program is a collection of objects, each designed to perform a specific task on specific sets of data, which work together to accomplish the desired function.

Object systems that allow interaction between objects in remote locations over a communications link are commonly referred to as distributed object systems. In these distributed systems a "client object" on a client system calls methods on a "server object" on an object server system, which may be in a remote location. The client object—server object interactions form the basis for the distributed object system. Distributed object systems define the protocols used to facilitate the client these interactions. The protocols require that specific server object configuration information be available to the client system to facilitate remote object interactions. This configuration information is generally determined when the server object is created and is then installed on the client system during the client system installation. Thus, the information needed for client objects on the client system to call methods on server objects on the server system is available on the client system.

This system works well when there is configuration information installed on the client system. However, in some cases the necessary configuration information is not installed on the client system. These clients are referred to as "zero install clients." Where no traditional client installation is preformed (i.e., the client is a "zero install" client) there is no opportunity to provide the required configuration information. For example, a web browser can be a used as a client system to access remote server objects through the WWW. Suppose that a company wishes to allow its customers to interact with distributed objects through their web server. When a new customer first accesses the web server, the customer's web browser will have no information regarding the specific aspects of the company's object server system. In particular, there will have been no traditional object client system installation during which the required object server installation information could have been installed on the customer's machine. The web browser, is thus a zero install client, and client objects on the web browser cannot interact with server objects on the company's object servers.

Without a method and apparatus to provide configuration information to clients such as web browsers, interaction between remote distributed objects will not be possible via the world-wide-web.

DISCLOSURE OF INVENTION

According to the present invention, a method and apparatus for allowing communications between client objects and server objects in a distributed object system is provided. The method and apparatus are particularly applicable for use over the Internet with web servers and web browsers. The method allows for the use of a web browser with no specialized pre-installed code (known as a "zero install" web client) to operate on remote objects through a web server, and thus facilitate a host of distributed object operations. An object reference server is used to distribute an object reference for a naming context object to an object request broker on the web browser. Once the web browser knows the location of the naming context object it can access other server objects through the web server. In the preferred embodiment, the object reference server comprises a web server with access to the object reference and the object reference comprises a stringified object reference. By delivering the stringified object reference to the web browser, interaction between the web browser and remote server objects over the Internet is facilitated.

DESCRIPTION OF THE PREFERRED EMBODIMENTS

A method and apparatus for bootstrapping an object client system with an object server system in a distributed system is provided. An object reference server is used to distribute an object reference for a naming context object to an object request broker on the web browser. By delivering the object reference to the web browser, interaction between the web browser and remote server objects over the Internet is facilitated. An overview of the World-Wide-Web and Object-Oriented Technology will now be provided.

Overview—World-Wide-Web

As discussed in the Background Section, communications over the "world-wide-web" (WWW) typically occurs between web browsers and web servers. A web browser receives data from the web server and displays that data on the user's workstation. The communication between web browsers and web servers is done according to any of several Internet protocols (i.e., hypertext transfer protocol (http); file transfer protocol (ftp); Internet Inter-Orb Protocol (IIOP).

Information transmitted from the web server to the web browser is generally formatted using a specialized language called Hypertext Markup Language (HTML). HTML is a special language that describes the structure of a document in a standard way that web browsers are able to understand and interpret. An HTML document stored on a web server, commonly called a "web page," can thus be downloaded by any web browser that supports HTML pages and displayed on the client machine. HTML allows web pages to be linked together using hypertext. Hypertext is a method of organizing text, graphics and other data that lets individual data elements point to other data elements. Thus, by using hypertext linking between pages web client users can selectively view pages that interest them.

Standard HTML pages can be used to deliver a wide range of information to the web browser, but are limited in that they are essentially static. The static nature of HTML pages limits the amount of interactivity they can provide between the web client and the web server. Without full interactivity between web clients and web servers, the full potential of the Internet could not be reached.

One method to add interactivity between web client users and web servers has been through the use of applets. Applets are small computer programs that are downloaded from the web server to web client, and when run on the web client can provide interactivity that was impossible using static web pages. To use an applet, the HTML applet tag <Applet> is inserted into the HTML page. The applet tag specifies the location of the applet on the web server. When a user visits that page, the applet tag causes the web server to download the specified applet to the web browser. The downloaded applet can run automatically, or run when selected by the web client user, depending on how the applet is configured and specified in the HTML page.

The uses for applets are limited only by the imagination of those who operate the web servers, with new and exciting applets being created every day. Most applets are written in a programming language called Java. In general, Java is a relatively new programming language with special features that facilitate the creation of executable content for distribution through networks. These features make the Java programming language ideal for use in the Internet environment.

Many modern web browsers (e.g., IBM WebExplorer, Netscape Navigator) are Java enabled. These browsers contain code designed to execute Java applets, called a Java virtual machine (VM). Thus, in addition to displaying standard HTML pages, Java-enabled browsers have the ability to interpret, execute and display Java content. Using Java applets in web pages, with the applets downloaded and executed by Java-enabled browsers allows for web servers to provide greater interactivity with web clients.

When a Java-enabled browser downloads a page containing the HTML applet tag, the browser recognizes that there is a Java program associated with that web page. The browser then downloads an attribute file specified in the applet tag that describes the execution of that applet. This file is written in what are called bytecodes. The Java-enabled browser is able to interpret these bytecodes and run them as an executable program on the web browser client. The process of using executable java-content in a Java-enabled browser can be transparent to the user, with the downloading and start of execution happening automatically.

One advantage to the Java programming language is that it is platform independent. This means that an applet, once written, can be downloaded and run on any client machine for which a Java enabled browser exists. Another advantage to Java is that it is an object-oriented programming language. As will be described later, the use of objects and object-oriented programming offers many advantages.

The growing popularity of the Internet and the WWW has opened the door to new and exciting possibilities for computers and information technologies. However, for these possibilities to be fully realized the web and web browsers must be integrated with existing software technologies. One of these technologies is the use of objects and distributed object technologies.

Overview—Object-Oriented Technology

Object-oriented programming allows programs to be organized as cooperative collections of objects, each of which represents an instance of some class, and whose classes are all members if a hierarchy of classes united via various class relationships. Object-oriented programming differs from standard procedural programming in that it uses objects, not algorithms, as its fundamental building blocks. This difference stems from the fact that the design focus of object-oriented programming technology is wholly different than that of procedural programming technology. The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services by a well defined encapsulating interface.

Data in an object is operated upon by calling "methods" on the object. In the object model, to client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameter that specify the details of objects that belong to its class. By defining a class, objects can be created that belong to the class without having to rewrite the entire definition. This promotes the reusability of existing definitions and promotes efficient use of program code.

There are many computer languages that support object-oriented programming. For example, Smalltalk, Object Pascal, C++ and Java are all programming languages that to one degree or another support object-oriented programming. Any of these and others can be used to write programs that use objects.

The Object Management Group (OMG) is a standards group formed to help standardize object software. The goal of the group is to provide specifications that form a common system for object based application development. This reduces the complexity and lowers the cost of introducing object based software applications. The Common Object Request Broker Architecture (CORBA) is an OMG specification designed to provide for the sharing of objects across a wide variety of hardware platforms and operating systems. Applications that conform to the CORBA specification can communicate with one another regardless of location or vendor. In particular, CORBA defines interoperability by specifying the design of Object Request Brokers (ORBs) such that ORBs from different vendors can interoperate. This is done by defining ORB interfaces in a language-independent specification.

An ORB is a program that establishes client-server relationships between objects. ORBs provide the infrastructure that allows objects to converse, independent of the specific platforms and techniques used to implement the objects. Using an ORB, a client can transparently invoke a method on a server object, which can be on the same machine or across a network. The ORB operates by intercepting method calls and finding an object that can implement the request, passing the request parameters to the object, invoking the method, and returning the results. While doing so, the client does not have to be aware of where the object is located, its programming language, its operating system and any other system aspects. Thus, the ORB provides interoperability between applications on different machines in heterogeneous distributed object environments and seamlessly interconnects multiple object systems.

CORBA also defines an object reference used to uniquely identify a particular object. An object reference (OR) is a set of data that identifies a particular object contained in a particular process running on a particular machine. Such an object reference is used as an unique identifier to distinguish an object from other objects. Typically such an object reference is a binary number comprising an object identifier prepended with the TCP/IP address of the machine on which the object resides and the TCP/IP port number of the process in which that object resides. Creating object references according to parameters established by the OMG allows ORBs from different venders to share object references.

CORBA uses the concept of a proxy object to facilitate communication between distributed objects. A proxy object is an object of a proxy class that has the same methods as a particular real object, except that each method on the proxy object does nothing other than forward the method request through an ORB and across the network to the real object. A proxy object thus has the same interface as the real object (i.e., the methods that can be performed on the object) but has a different implementation (i.e, instead of performing the method, the method request is passed to the real object.)

When writing a distributed CORBA application, the "real" server object class is first defined. This includes defining the interface for that server object class, i.e, the methods that can be called on objects in this class. The interfaces are defined in a CORBA Interface Description Language (IDL). Thus, all methods that are performed on CORBA objects are written using IDL.

Next, a proxy class of objects for the real server object class must be created. This is done by taking the IDL file which defines the methods on the real object class and running it through a tool called an IDL compiler. The IDL compiler creates a new class of objects, a proxy class for the original class. This proxy class has the same interface as the original class and thus has the same methods, but the implementation of these methods is to pass the method requests through the ORB on to the original objects.

For example, a distributed object program could comprise a group of checking account objects. Each checking account object would be a member of the checking account class. A programmer would first define the checking account class and then, using IDL, write the methods that are performed on the checking account class, such as deposit, withdraw and get_balance. An instance of the checking account class could be created for each customer's account. For example, John'sAccount object and Susan'sAccount object could be created, with each object an instance of the checking account class. Each instance of the class would have the deposit, withdraw and get_balance methods in its interface.

When the IDL file defining these method is run through an IDL compiler, a "checking account proxy" class is created that has deposit, withdraw and get_balance methods defined in its interface, but when these methods are called, the implementation is such that the requests are passed to the real objects.

When a CORBA compliant client program is created it is designed to call methods on the relevant proxy class of objects. Before such a program can run however, an actual instance of the proxy class of objects must be obtained. This processes is called binding. Binding is performed by naming context objects (NCO). Naming context objects are specialized server objects designed to get proxy objects when requested by clients, and thus act as object directories. NCOs contain object references for objects as well as other "nested" NCOs. The "base" NCO is generally referred to as the root NCO, and is analogous to the root directory in a normal computer directory structure. With a copy of the root NCO, the client program can call a binding method on the root NCO to retrieve an instance of the proxy class of objects for a particular real server object on the server.

Thus, in our checking account example, a client program is designed to interface with the checking account class of objects. Before the client can invoke any methods on any particular checking account object, a proxy object for that object must be obtained. A binding method is performed on a NCO requesting a proxy object for one of the accounts, for example, John'sAccount. The NCO returns a proxy object (an instance of the checking account proxy class) for John'sAccount. This proxy can then be used by the client to perform methods on the real server object of John's Account through the ORB.

Of course, for a client program to be able to call the binding method on the naming context object, a proxy for the NCO must be on the client. The process of dynamically creating a proxy for the NCO on the client program is generally referred to as "bootstrapping." Bootstrapping can be thought of generically as providing the necessary information to a client program for it to operate with a server program. In the object-oriented case, bootstrapping involves getting a proxy for the NCO on the client machine, such that the NCO can be used to get proxies for other objects which the client wishes to operate upon.

To facilitate bootstrapping, CORBA defines a method called "resolve_initial_references." Resolve_initial_references is a method performed on the ORB object class which causes the ORB to request a proxy for a NCO. For the ORB to be able to request a proxy for the NCO, it must know the location of the NCO. For this, CORBA defines a stringified object reference (stringified OR).

A stringified OR is created by taking an object reference and converting it to a character string that can be read and edited by a text editor according to a CORBA defined process. Whenever an object server is created, the installation procedure creates an instance of each object that may be of interest in the future, creates a stringified OR of it, and stores the stringified OR in a designated file on the object server machine. During the installation of an ORB client, the stringified OR is stored on the client as one of the ORB program files. Thus, during bootstrapping, resolve_initial_references causes the ORB to retrieve a proxy object for the NCO specified in the stringified OR stored in its program files.

With a proxy object for the NCO on the client system, the client system can obtain proxy objects for any real server object in the NCO "directory" by calling the appropriate "look-up" method on the NCO proxy.

Object request brokers (ORB's) are thus a well known technology that allows an application on one machine to invoke methods on objects that reside on another machine. By writing an ORB in Java, an ORB can be created that seemlessly integrates with the World-Wide-Web, web servers, and web browsers.

For example, by creating an ORB in Java, an applet dynamically downloaded to the client invokes methods on objects residing on a remote object server that is accessible through the web server. The ORB and the applet can be downloaded using standard internet protocols. Thus, with the ORB implemented in Java, neither the applet nor the ORB has to be installed on the machine in advance. Additionally, the ORB is client and platform independent and will run on any machine that supports Java. Thus, by creating an Java ORB that operates on a web browser, a platform independent, zero install, distributed object client system is provided.

To implement such a system, the Java ORB client must be bootstrapped to work with the object servers. As stated before, the usual procedure is to store a copy of the stringified OR for a NCO on the client system during the installation of the client system. The stringified OR is then used to obtain a proxy for the NCO, thus bootstrapping the client system. In this case, the client includes a Java ORB running on a web browser, and there is no installation during which the stringified OR could have been stored on the client.

For example, assume that a company wishes to allow its customers to interact with server objects through their web server. When a new customer first visits the web site they will have no information regarding the specific aspects of the company's object server system. In particular, there will have been no client installation during which a stringified OR could have been stored on the customer's machine to be used by the Java ORB to facilitate bootstrapping. Without the stringified OR reference on the client, the CORBA bootstrapping method cannot be used to create a naming context object proxy on the customer's machine.

The remainder of this specification discloses an apparatus and method for bootstrapping a "zero install" client system to allow for communicating across a distributed object system. The preferred method and apparatus facilitate an initial bootstrapping of a zero install client such that CORBA procedures can be used to complete the bootstrapping.

DETAILED DESCRIPTION

Figure 3:
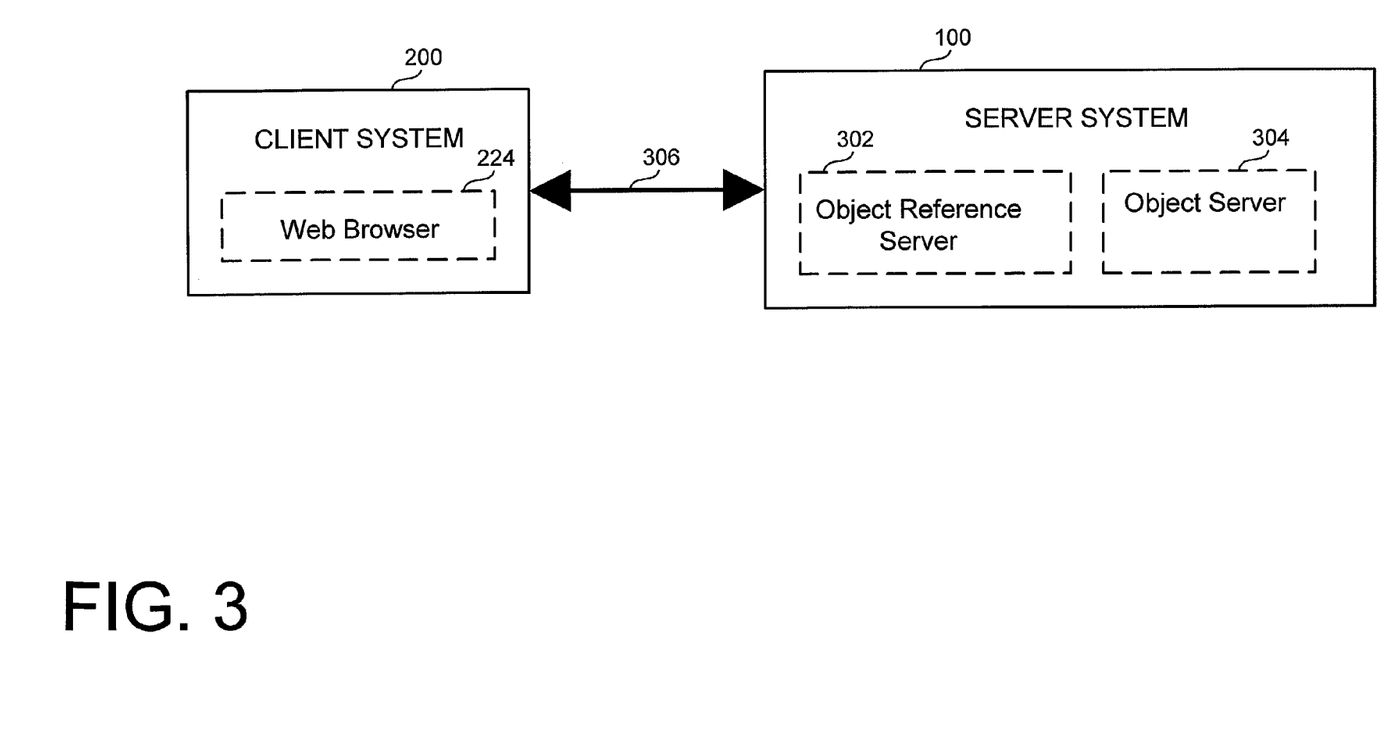
FIG. 3 is a functional diagram of a client system and server system.

Referring now to FIG. 3 a client system 200 and a server system 100 are shown to illustrate an embodiment of the present invention. The client system 200 is connected to the server system 100 over network connection 306. The network connection 306 can be any network mechanism, such as a local area network (LAN), a wide-area-network (WAN), an intranet connection, but is preferably an Internet connection allowing the client system 200 to communicate with the server system 100 over the World-Wide-Web.

The client system 200 can be any suitable client system, such as an IBM compatible personal computer. The client system 200 preferably includes a web browser application 224. Again, the web browser application 224 can be any web browser, such as IBM WebExplorer or Netscape Navigator. In the preferred embodiment the web browser application 224 is capable of running downloaded applets, and in particular, capable of interpreting and executing Java applets.

The server system 200 preferably comprises an object reference server 302 and an object server 304. The object reference server 302 comprises a mechanism for delivering an object reference to the client system 200. The object reference server 302 can comprise any mechanism for delivering the object reference to the client system 200, but preferably comprises a web server application with accesses to the object reference and the ability to deliver the object reference to the client system 200. In other embodiments, the object reference server 302 could comprise a stand alone server written only to deliver the object reference to the client system 200. In the preferred embodiment, the object reference that is delivered to the client system 200 comprises a stringified object reference (stringified OR) for the root naming context object (root NCO).

By delivering the object reference to the client system 200, the object reference server 302 facilitates communication between client system 200 and objects accessed through object server 304. In particular, by providing the object reference to the root NCO, the client system is able to retrieve proxies for other objects on the object server 304 and can thus access methods on those objects.

Figure 1:
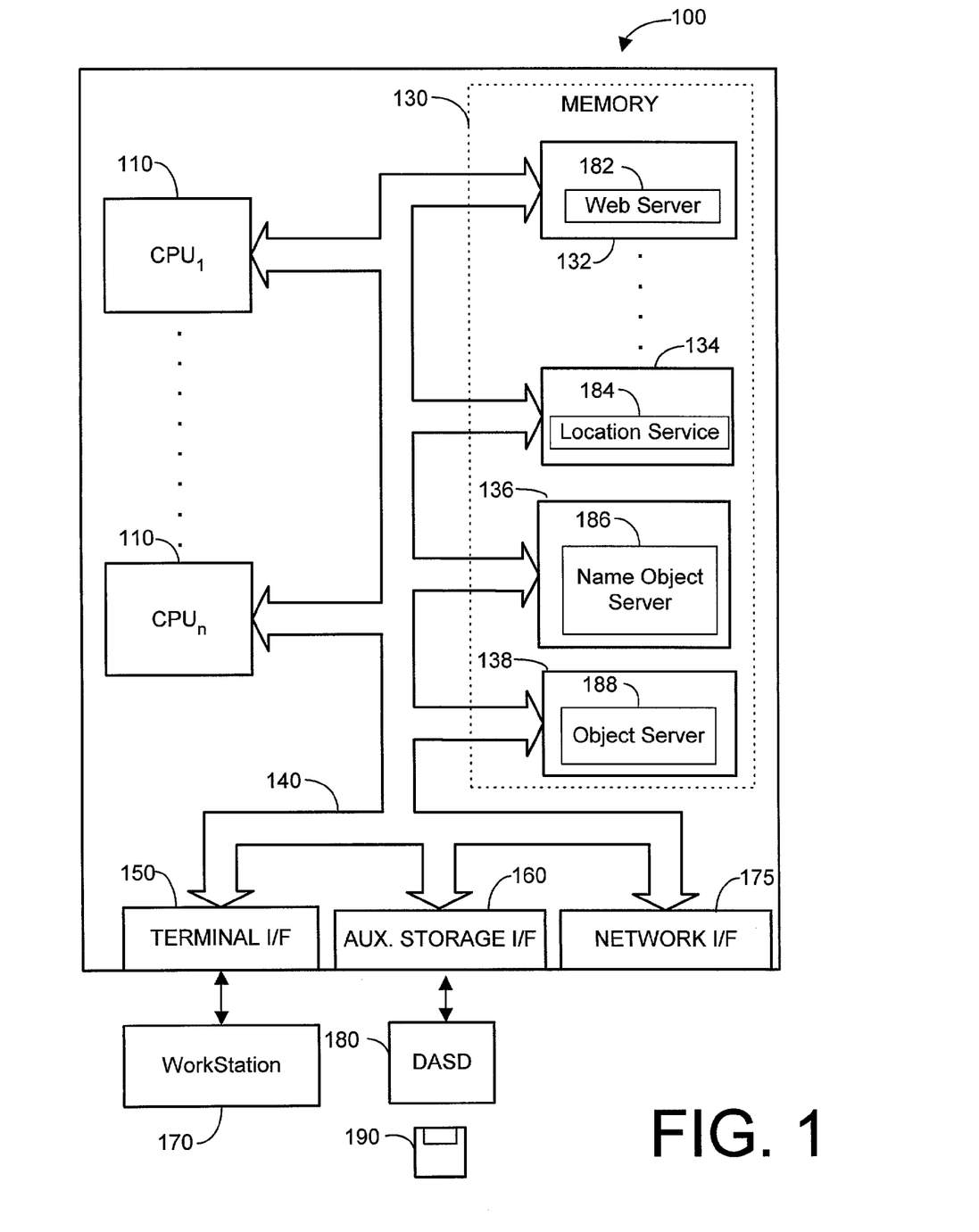
FIG. 1 is a schematic view of a server system in accordance with the preferred embodiment.

Referring now to FIG. 1, a server-side computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In this example, memory 130 includes a web server application 182 running in location 132, a location service application 184 running in location 134, a name object server application 186 running in location 136, and an object server application 188 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computer that collectively comprise system 100. For example, web server application 182 may reside on one computer with $CPU_1$, name object server application 186 may reside on another computer system with a separate $CPU_2$, location service application 184 may reside on another computer system on a third computer system with a different $CPU_{n-1}$ and object server application 188 may reside on a fourth computer with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM PS/2 personal computer, RS/6000 or an AS-400 computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. In the preferred embodiment the network interface 175 provides a connection to the Internet and the World-Wide-Web, but could also be to connect to other networked environments, such as internal web-based systems (typically called Intranets). Being thus connected, web browsers can interact with web server application 182 through the internet. The present invention applies equally no matter how computer system 100 may be connected to other computer systems and/or workstations, regardless of whether the connection is made using present-day analog and/or digital techniques or via some networking mechanism of the future.

Figure 2:
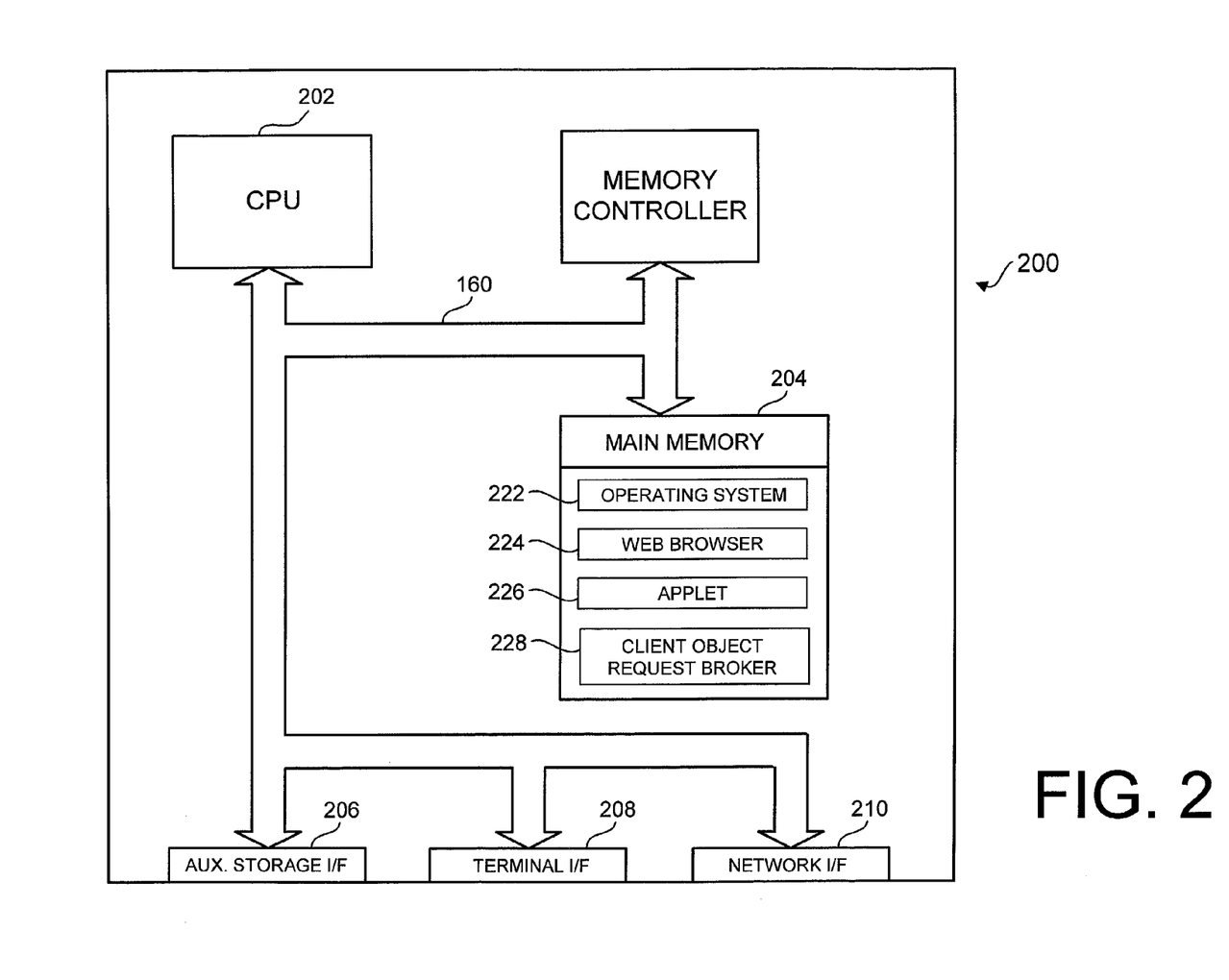
FIG. 2 is a schematic view of a client system in accordance with the preferred embodiment.

Turning now to FIG. 2, a block diagram of a client side computer system is shown in accordance with the present invention. The computer system can be any suitable client system, such as an IBM compatible personal computer. However, those skilled in the art will appreciate that the mechanisms and apparatus of the present invention apply equally to any computer system, regardless of whether the computer system is a complicated multi-user computing apparatus or a single user personal computer. As shown in the exploded view of FIG. 2, computer system 200 comprises main or central processing unit (CPU) 202 connected to main memory 204, auxiliary storage interface 206, terminal interface 208, and network interface 210. These system components are interconnected through the use of a system bus 160. Auxiliary storage interface 206 is used to connect mass storage devices (such as DASD devices) to computer system 200.

Main memory 204 contains an operating system 222 and a web browser 224. Furthermore, in accordance with the preferred embodiment, an applet 226 and a client object request broker (ORB) 228 are downloaded from a web server such as web server application 182 of FIG. 1 and stored in memory 204. Computer system 200 preferably utilizes well known virtual addressing mechanisms that allow the programs of computer system 200 to behave as if they only have access to a large, single storage entity instead of access to multiple, smaller storage entities such as main memory 204 and DASD devices. Therefore, while operating system 222, web browser 224, applet 226 and client ORB 228 are shown to reside in main memory 204, those skilled in the art will recognize that these programs are not necessarily all completely contained in main memory 204 at the same time. (It should also be noted that the term "computer system memory" is used herein to generically refer to the entire virtual memory of computer system 200.)

Operating system 222 can be any operating system, such as OS/2, Windows, AIX, OS/400 etc, and those skilled in the art will appreciate that the spirit and scope of the present invention is not limited to any one operating system.

Again, web browser 224 can be any web browser, such as IBM WebExplorer or Netscape Navigator capable of running downloaded applets such as applet 226. As such, web browser 224 preferably comprises a web browser that is capable of interpreting and executing Java commands, and thus preferably comprises a Java virtual machine.

Although computer system 200 is shown to contain only a single main CPU and a single system bus, those skilled in the art will appreciate that the present invention may be practiced using a computer system that has multiple CPUs and/or multiple buses.

Terminal interface 208 is used to directly connect one or more terminals to computer system 200. These terminals may be non-intelligent or fully programmable workstations, are used to allow system administrators and users to communicate with computer system 200.

Network interface 210 is used to connect other computer systems and/or workstations to computer system 200 in networked fashion. In the preferred embodiment the network interface 210 includes a connection to the Internet and the World-Wide-Web, but could also be to connect to other networked environments, such as internal web-based systems (typically called Intranets). The present invention applies equally no matter how computer system 200 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Figure 4:
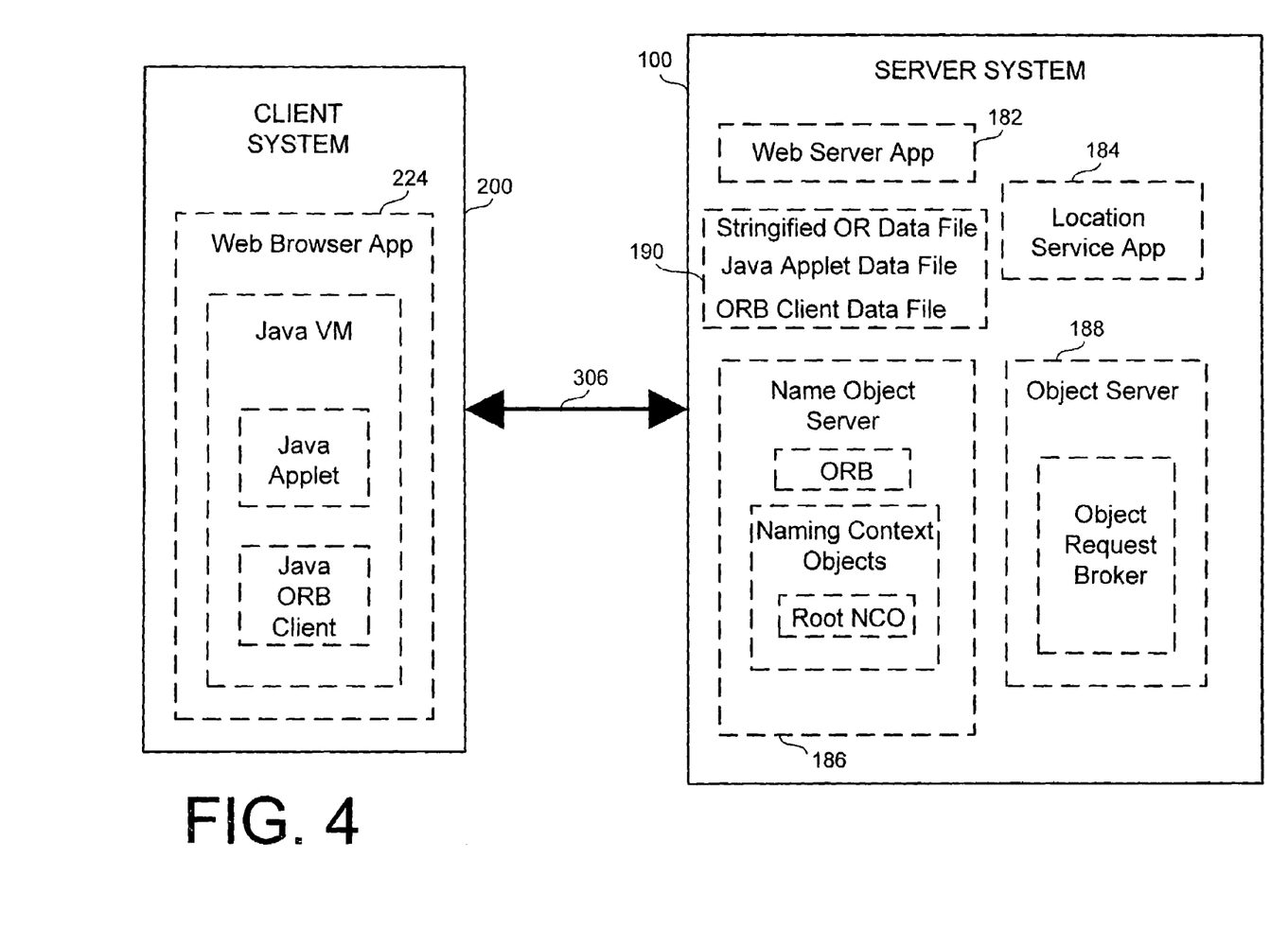
FIG. 4 is a functional diagram of the preferred client system and preferred server system.

Referring now to FIG. 4, computer system 100 and computer system 200 are illustrated as functional blocks to better illustrate the preferred embodiment of the present invention. Again, the server system 100 includes: web server application 182, location service application 184, name object server application 186, and object server application 188. The client system 200 includes web browser application 224. The server system 100 is connected to client system 200 through network connection 306. In the preferred embodiment, the network connection includes the Internet and World-Wide-Web, but could include any other type of network interconnection.

The web browser application 224 can be any web browser, such as or IBM WebExplorer or Netscape Navigator but is preferably a Java enabled web browser and thus contains a Java virtual machine (VM) for running downloaded Java applets.

Web Server application 182 provides the communication links between the web browser 224 on the client system 200. The Web server application 182 can comprise any suitable web server application such as IBM Internet Connection Server, Netscape Web Server, etc. In the preferred embodiment, the web server application 182 functions as an object reference server, i.e., a mechanism for delivering a stringified OR from the server system 100 to the client system 200. The web server can be used as an object reference server by providing a mechanism for the web server 182 to retrieve and download the stringified OR to the web browser 224.

To facilitate delivering the stringified OR to the web browser, the stringified OR is stored in the server system 200 where it is accessible to the web server 182. This allows the web server 182 to retrieve the stringified OR and download it to the web browser when needed. In the preferred embodiment, the stringified OR is placed in the web server directory to facilitate the web server's access to the stringified OR. This can be done in several ways. For example, the name object installation procedure can be modified to ask for directions as to where the a copy of the stringified OR should be placed to be accessible by the web server. In the alternative, a copy of the stringified OR can be manually created and copied to the web server directory.

The server system also preferably contains an applet data file and a Java ORB client data file. Again, these are preferably stored such that they are available to the web server application 182 to be downloaded to web browser application 224 when requested. The applet file preferably comprises a Java applet compatible with the Java VM on the web browser. Thus, when the Java applet is downloaded to web browser application 224, it can be executed by the web browser.

The Java applet is itself preferably an object, one of the applet class, with methods defined to operate on it. The applet is generally written with the understanding that it will access objects on a remote object server. In the preferred embodiment, the Java applet is designed to facilitate access to objects residing on the server system by calling methods on the relevant proxy class of objects. Again, proxy objects are a shell of a real object that have the same methods as the real objects, except these methods do nothing but forward the request through the ORB to the real server object. The proxy objects interact with the ORB by calling private interfaces on the implementation of the ORB classes.

For example, a "home banking" applet might be designed to operate on a checking account class of objects and a savings account class of objects. This applet would contain a proxy for checking account class and a proxy for the savings account class. However, before the applet could invoke any methods on any particular checking account or savings account object, a proxy object for that object must be obtained.

The ORB client is also preferably stored on the server system 200 where it can be retrieved by the web server 182 and downloaded to the web browser 224. Again the ORB client is preferably a Java ORB client that can be run by the web browser 224. ORBs are thus a well known technology that allows an application on one machine to invoke methods on objects that reside on another machine. By writing an ORB in Java, an ORB is can be created that seamlessly integrates with the World-Wide-Web, web servers, and web browsers.

For example, the Java applet is dynamically downloaded to the web browser 224. The Java applet can then call methods on proxy objects which will then be forwarded through the Java ORB and web server 182 to the real server objects residing on a remote object server. The Java ORB client and the applet can be downloaded using standard internet protocols. Thus, with the ORB implemented in Java, neither the applet nor the ORB has to be installed on the machine in advance. Additionally, the ORB is client and platform independent and will run on any machine that supports Java.

Thus, by creating an Java ORB an object client system is created that is platform independent, zero install, distributed object system. To implement such a system, the Java ORB client must be initialized to work with the object servers. In accordance with the preferred embodiment, a bootstrapping technique using a stringified OR and a object reference server (i.e., a web server with access to the stringified OR) is used to initialize the Java ORB client. As will be explained in more detail in relation to FIG. 5, the web server is used to deliver the stringified OR to the Java ORB, which can then communicate with objects on the object servers.

In the preferred embodiment, the name object server 186 and the object server 188 are CORBA compliant object servers. The name object server 186 is just an object server that contains naming context objects (NCOs) and, in particular, a root NCO. In particular, the naming context objects keeps tables of human readable object names and their associated object reference data, and can thus translate from one to another. The name object server 186 and the object server 188 are illustrated separately for clarity only, as they could be implemented as a single object server. Conversely, the server system 100 could comprise additional object servers not illustrated. Generally, the number of object servers utilized will be a function of overall processing demands and the number of object types.

In the preferred embodiment a location service application 184 is used to monitor incoming method requests and assure that the server containing the destination object is running. If that server is not running, the location service application 184 starts up that object server and assigns it a port number. The location service application 184 does not have to be an object service, instead it only needs know which object servers are running at a given time and how to starts those that are not running when an object on them is requested. Thus, the only programs that must be running to allow the object servers to start up is the location service application 184 and the web server application 182. Preferably, in addition to having an object ID that points to the NCO, the stringified OR for this initial NCO has a machine name and port number that points to the location service.

When the location service application 184 gets a request for the root NCO, it forwards the request to the name object server 186. If the name object server 186 was not previously started, the location service application 184 starts up the name object server 186 and instantiates the requested NCO before forwarding the request.

Figure 5:
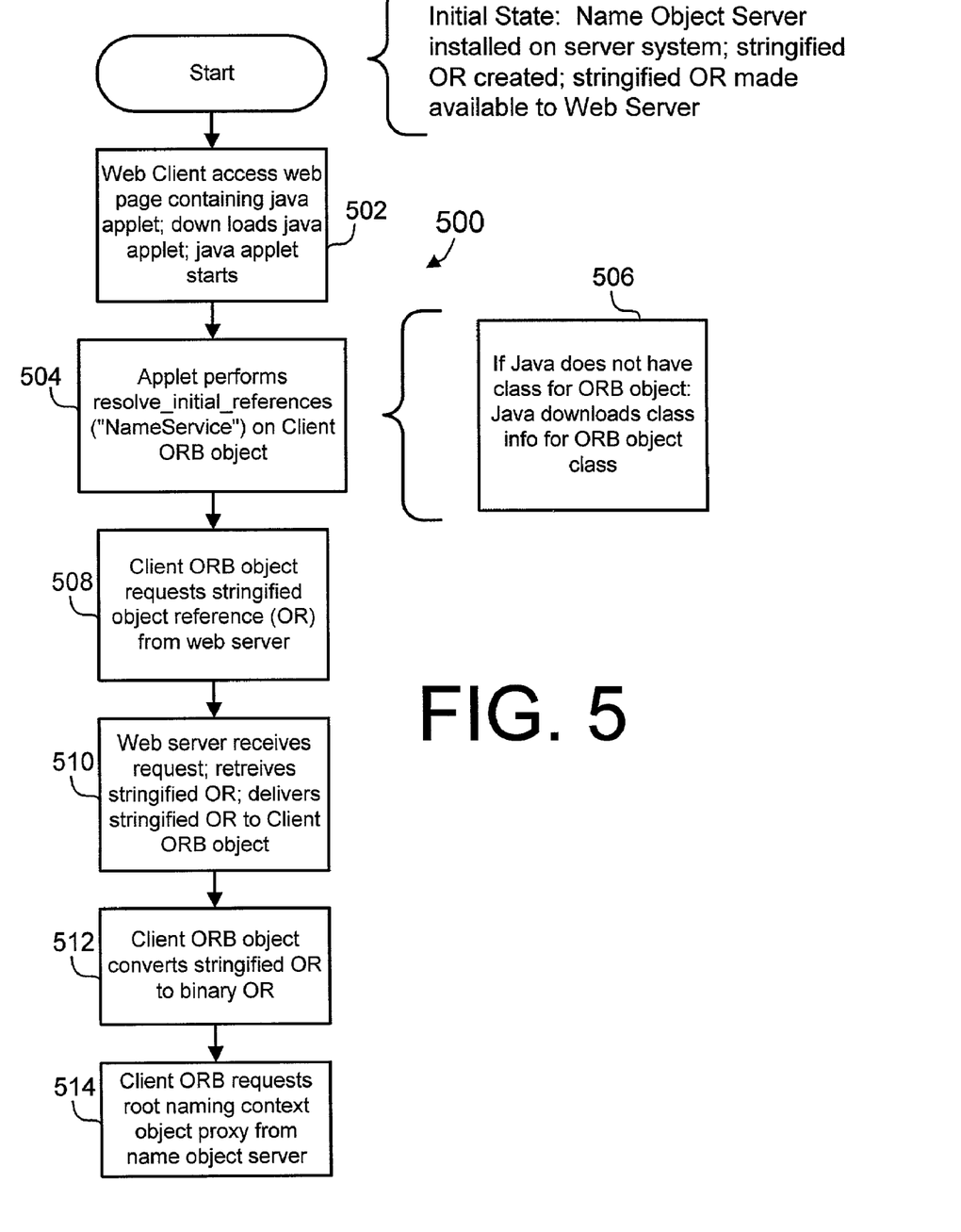
FIG. 5 is a flow diagram illustrating the preferred bootstrapping method.

Turning to FIG. 5, a bootstrapping method 500 in accordance with the preferred embodiment is illustrated. The bootstrapping method 500 is especially applicable to the case of a web browser visiting a web site for the first time and performing functions that require methods to be preformed on objects stored in the server system. Bootstrapping will always be necessary when a client visits a particular site for the first time, but may also be necessary when a client has for one reason or another lost the object reference to a NCO, or when the object servers have been changed and new object references created.

To begin a bootstrapping procedure an object server must be installed on the server system to provide access to a plurality of real server objects. Additionally, a web server and location service application would also installed on the preferred server system. A stringified OR has been created and made available to the web server, typically as part of the object server installation routine. .

The client typically contains an "empty" web browser, meaning the web browser has no information regarding the server system object servers. The web browser would preferably contain a Java VM enabling it to download and execute Java applets.

At step 502, the web browser goes to a web page in which server objects will be accessed and the web browser downloads an HTML page. Preferably, the HTML page contains an applet written in Java. The Java applet is written to facilitate access to objects residing on the server system. The Java applet is itself preferably an object, one of the applet class, with methods defined to operate on it. To use a Java applet, the HTML applet tag <Applet> is inserted into the HTML page. The applet tag specifies the location of the Java applet on the web server, and causes the web server to download the specified applet to the web browser. The applet is generally written with the understanding that it will access objects on a remote object server.

Inside the applet are class parameters for the relevant proxy class of objects it is designed to operate on. Again, a proxy object is an object of a proxy class that has the same methods as a particular real object, except that calling a method on the proxy object does nothing other than forward the method request through an ORB and web server to the real server objects.

The downloaded applet can run automatically, or run when selected by the web client user. This can be done by providing appropriate implementations of the start( ) and/or init( ) methods, both of which are java methods that operate on the applet class.

Before the downloaded applet can operate on a particular server object, an actual instance corresponding to that server object of the proxy class of objects must be obtained. This processes is called binding. Binding is performed by naming context objects (NCO), and thus a proxy for the naming context object must be obtained by the client before any other interaction can take place.

According to the next step 504, the applet calls the method of resolve_initial_references("NameService") on the Java ORB client. Resolve_initial_references is a method performed by the ORB client to request the stringified OR for a naming context object (NCO) from the web server. With the stringified OR a proxy for the NCO be obtained.

Resolve_initial_references is a static method performed on the ORB class. Thus, the method can be performed on the ORB client object without requiring a specific instance of the ORB client object to be created. Thus, downloading the ORB requires only that the class parameters to the ORB class must be downloaded to the Java VM. If this is the first time the web client has visited this particular site it is unlikely that the Java VM will have the class parameters for the ORB object class. In this case, the next step is step 506, download the class parameters for the ORB object class. This is done automatically by the Java VM and the operation is transparent to the Java applet which called the method. Because the resolve_initial_references method is a static method, an instantiation of the ORB object does not need to be made before the ORB object is operated on. Instead, the method operates on the whole class of objects.

With the class parameters for the ORB object class downloaded, the resolve_initial_references method can be performed by the ORB object at step 508. The resolve_initial_references method causes the client ORB to request the stringified OR for a naming context object from the web server. This request may include the URL for the stringified OR, where the URL was downloaded as part of the Java applet or part of the HTML. The request can be made using the "url-connection.getcontent" Java command or other suitable means for instructing the web browser or Java VM to retrieve the stringified OR from the web server. The URL might be "hardcoded" into the ORB code, supplied as a parameter at server ORB installation time, or supplied as a parameter to the applet.

In step 510, the web server receives the request, retrieves the stringified OR and delivers the stringified OR to the web browser. The web browser delivers the stringified OR to the ORB client object. The web browser knows to deliver the stringified OR to the ORB client because the original request was made using a Java command.

In step 512 the ORB client receives the stringified OR and converts it to a regular "binary" object reference to a naming context object. The OR contains, among other data items, an object identifier for the NCO, the TCP/IP address of the machine on which the name object server is running and the TCP/IP port number of the process in which the NCO resides. With the OR, the ORB client can retrieve a proxy for the NCO. The NCO is a "catalog" of all the objects that are available (i.e., those on this server, and all other available servers).

With a proxy of the NCO on the client, the Java applet can call a "look-up" resolve" method on the NCO to retrieve an instance of the proxy class of objects (a proxy object) for any of the available server objects. With the proxy object, the applet can call any method on the remote server object by calling that method on the proxy object. Thus, a distributed object system connection is established, and the web client has been bootstrapped to the object servers in the server system.

Thus, the preferred method and apparatus provide a mechanism for bootstrapping a object client system with an object server system in a distributed object system. The method and apparatus are particularly applicable to use over the internet with web servers and web browsers. The method allows the use of a "zero install" web client to operate on remote objects through the web server, and can thus facilitate a host of distributed object operations.

The invention claimed is:

1. An apparatus comprising:
at least one processor;
a memory coupled to the at least one processor;
a computer program residing in the memory, said computer program including a object reference server mechanism comprising a web server for bootstrapping a remote second apparatus comprising a web browser, said web server of said object reference server mechanism delivering an object reference for a naming context object to said web browser of said remote second apparatus upon request of said second apparatus.

2. The apparatus of claim 1 wherein said computer program comprises a web server.

3. The apparatus of claim 2 wherein said object reference is stored in a web server directory.

4. The apparatus of claim 1 wherein said contact with said computer program is accomplished by a web browser located on said zero install client.

5. The apparatus of claim 1 wherein said object reference comprises a stringified object reference.

6. The apparatus of claim 1 wherein said object reference comprises a stringified object reference and wherein said naming context object comprises a root naming context object.

7. A method for enabling client object—server object interaction, the method comprising the steps of:

a) creating an object reference for at least one naming context object on a server system; and
b) downloading said object reference from said server system to a client system after said client system has contacted said server system, said client system being a zero install client.

8. The method of claim 7 wherein the step of creating an object reference comprises creating a stringified object reference.

9. The method of claim 7 wherein said naming context object comprises a root naming context object.

10. The method of claim 7 wherein said contact with said server system is accomplished by a web browser executing on said client system and wherein the step of downloading said object reference comprises downloading by a web server application.

11. The method of claim 10 wherein said web-browser comprises a Java-enabled web browser.

12. The method of claim 10 wherein said web browser comprises a Java-enabled web browser containing a CORBA compliant Java Object Request Broker.

13. The method of claim 10 wherein said server system further includes a location service application, and wherein said step of downloading said object reference is performed by a web server application in said server system.

14. The method of claim 13 wherein said web server includes a name object server.

15. The method of claim 13 further comprising the steps of:
downloading an applet from said web server to said web browser and running said applet on said web browser;
downloading an object request broker from said web server;
requesting said object reference from said web server; and
retrieving a proxy for said naming context object using said retrieved object reference.

16. The method of claim 15 wherein the step of downloading said object request broker comprises downloading the class of said object request broker from the web server.

17. A program product comprising:
(A) a computer program; said computer program enabling client object—server object interaction for a client object located on a zero install client, said client object—server object interaction being enabled by delivering an object reference for a naming context object to said zero install client after said zero install client has contacted said computer program; and
(B) recordable media bearing said computer program.

18. The program product of claim 17 wherein the signal bearing media comprises recordable media.

19. The program product of claim 17 wherein the signal bearing media comprises transmission media.

20. The program product of claim 17 wherein said naming context object is delivered to a remote web browser located on said zero install client.

21. The program product of claim 17 wherein said computer program comprises a web server having access to said object reference.

22. The program product of claim 17 wherein said object reference comprises a stringified object reference.

23. The program product of claim 17 wherein said object reference comprises a stringified object reference of a root naming context object.

24. A program product comprising:
(A) applet, said applet including an object reference uniform resource locator for retrieving an object reference for a naming context object from a web server apparatus having access to said object reference, said applet requesting said object reference for said naming context object using said uniform resource locator; and (B) recordable media bearing said applet.

25. The program product of claim 24 wherein the signal bearing media comprises recordable media.

26. The program product of claim 24 wherein the signal bearing media comprises transmission media.

27. The program product of claim 24 wherein the signal bearing media comprises the Internet.

28. The program product of claim 24 wherein said server apparatus comprises a web server having access to said object reference.

29. An apparatus comprising:
 at least one processor;
 a memory coupled to the at least one processor;
 a server system, said server system comprising:
   a) at least one object server, said at least one object server including a naming context object;
   b) a web server, said web server having access to a stringified object reference for said naming context object, wherein said web server downloads said stringified object reference to a web browser when said stringified object reference is requested by said web browser.

30. A method for enabling client object—server object interaction, the method comprising the steps of:
 a) creating an object reference for at least one naming context object;
 b) storing said object reference in a web server directory;
 c) downloading an applet from a web server to a web browser and running said applet on said web browser;
 d) downloading an object request broker from said web server;
 e) requesting said object reference from said web server; and
 f) retrieving a proxy for said naming context object using said retrieved object reference.

31. The method of claim 30 wherein the object request broker comprises a Java object request broker.

32. The method of claim 30 wherein the object reference comprises a stringified object reference.

33. The method of claim 30 wherein the step of downloading an object request broker comprises downloading a Java object request broker.

* * * * *